US006233833B1

(12) United States Patent
Grant et al.

(10) Patent No.: US 6,233,833 B1
(45) Date of Patent: *May 22, 2001

(54) RECIPROCATING SAW WITH CLAMP FOR RECEIVING BLADE IN MULTIPLE ORIENTATIONS

(75) Inventors: Jeffrey P. Grant, Forrest Hill; Jason R. Melvin, Towson, both of MD (US)

(73) Assignee: Black & Decker Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,629

(22) Filed: Jun. 4, 1998

Related U.S. Application Data

(60) Provisional application No. 60/048,750, filed on Jun. 5, 1997.

(51) Int. Cl.[7] ............................................. B27B 19/09
(52) U.S. Cl. ............................ 30/392; 30/337; 83/699.21; 279/75
(58) Field of Search ................................. 30/392.4, 327, 30/337, 500; 83/699.21; 279/75

(56) References Cited

U.S. PATENT DOCUMENTS

| | | | |
|---|---|---|---|
| 2,735,685 | * 2/1956 | Karr ................................... | 30/392 X |
| 2,998,830 | 9/1961 | Atkinson . | |
| 3,028,890 | * 4/1962 | Atkinson et al. .................. | 30/392 X |
| 3,360,021 | * 12/1967 | Mejia ................................ | 30/392 X |
| 3,412,767 | * 11/1968 | Green, Jr. ........................... | 30/392 |
| 3,496,972 | 2/1970 | Rees . | |
| 3,802,079 | * 4/1974 | Ketchpel, Jr. et al. ............. | 30/394 X |
| 3,876,015 | * 4/1975 | Kivela ............................... | 30/392 X |
| 4,204,692 | * 5/1980 | Hoffman ............................ | 30/394 X |
| 4,601,477 | 7/1986 | Barrett et al. . | |
| 4,976,164 | 12/1990 | Lentino . | |
| 5,165,173 | * 11/1992 | Miller ................................ | 30/392 |
| 5,193,281 | 3/1993 | Kasten . | |
| 5,340,129 | * 8/1994 | Wright .............................. | 30/337 X |
| 5,479,711 | * 1/1996 | Hathcock ........................... | 30/393 |
| 5,575,071 | * 11/1996 | Phillips et al. ..................... | 30/392 |
| 5,724,742 | * 3/1998 | Grabowski ......................... | 30/392 |
| 5,794,352 | * 8/1998 | Dassoulas .......................... | 30/392 |
| 5,885,070 | * 1/1999 | Grabowski ........................ | 30/392 X |
| 5,903,983 | * 5/1999 | Jungmann et al. ................. | 30/392 |

FOREIGN PATENT DOCUMENTS

| | | |
|---|---|---|
| 0072282 | 2/1983 | (EP) . |
| 9400264 | 1/1994 | (WO) . |

* cited by examiner

Primary Examiner—M. Rachuba
(74) Attorney, Agent, or Firm—Michael P. Leary; Bruce S. Shapiro

(57) ABSTRACT

A reciprocating saw 11 with a keyless blade clamp 35 having a slotted-channel 37 in a clamp body 39 for receiving a blade 40 alternatively in first and second, intersecting cutting planes. The blade 40 may be alternatively oriented in four 90° offset orientations with the blade teeth facing in the same directions as the top, bottom, left and right side of the saw 11. When the retainer 53 is in the clamp disengaged position, a blade 40 may be slidably inserted and removed from the channel 37 in any of the four 90° offset orientations. A retainer 53 is located in a track 51 in the clamp body 39 and is movable between clamp engaged and disengaged positions. When the blade 40 is located in the first cutting plane, the retainer 53 engages the edge 55 of the blade. When the blade 40 is in the second cutting plane, the retainer 53 engages the sidewall 57 of the blade 40. A manual operated, spring biased release 61 is pivotally connected to the clamp body 39 and is connected to the outer tips 73, 75 of the retainer 53 for moving the retainer 53 between a clamp engaged and a clamp disengaged position.

26 Claims, 3 Drawing Sheets

RECIPROCATING SAW WITH CLAMP FOR RECEIVING BLADE IN MULTIPLE ORIENTATIONS

This application claims benefit of Provisional No. 60/048,750 filed Jun. 5, 1997.

BACKGROUND OF THE INVENTION

This invention relates to saws and more particularly relates to reciprocating saws that are used typically for rough cutting applications and relates to clamps for clamping the blade in the saw.

Reciprocating saws are used by variety of tradesmen such as plumbers, electricians and carpenters for both remodeling and new construction. Many of the applications require the saw to be used in confined locations that restrict the maneuverability of the saw. Conventionally such saws have an elongated, integral housing and have the blade fixed for reciprocation in a single plane. One known way for increasing the maneuverability of the saw is to make the blade clamp and drive rotatable about the axis of reciprocation of the output shaft of the saw. As a result the blade can be rotated into any angular orientation about the axis of reciprocation permitting the blade to more easily positioned for cutting in a corner or adjacent to the vertex of an angular workpiece. Examples of such saws are disclosed in U.S. Pat. No. 5,193,281 and PCT application WO94/00264. These approaches requiring the drive shaft to be rotatable about its axis of reciprocation are complex and have not proved to be practical.

Another approach is to make the blade holder capable of receiving the blade in a plurality of cutting planes parallel to the axis of reciprocation. An example of this approach is disclosed in European patent application 0,072,282. The clamp has a plate connected to the output shaft with screws. To change blade orientation between 90° offset cutting planes requires removing the plates by unscrewing the screws, changing the blade orientation, rotating the plate 180° and then reattaching the plate to the shaft. While simpler and more practical, this approach still fails to achieve the desired level of simplicity.

A further strong design preference in power tools today is to develop keyless chucks and clamps which do not require tools for clamping and unclamping an accessory bit or blade in the power tool. A keyless clamp is desirable because it is normally easier to use and can be used without auxiliary tools which frequently become misplaced or lost. As used herein, a keyless clamp means a clamp that can be opened and closed without the aid of an auxiliary tool by manual adjustment of the clamp segments.

SUMMARY OF THE INVENTION

The present invention has multiple aspects. According to one aspect of the present invention, a clamp for a reciprocating saw comprises a clamp body for connection to an output shaft of the saw. A channel is formed in the body for receiving a blade oriented relative to the channel alternatively in first and second, intersecting cutting planes.

Preferably the channel has a pair of intersecting slots for slidably receiving the blade in first and second cutting planes. The blade may be oriented in the first cutting plane with the teeth facing in the same direction as the bottom or top of the clamp body and may be oriented in the second cutting plane with the teeth facing in the same direction as the right or left sidewall of the clamp body.

Preferably the clamp has a retainer located in a track of the clamp body and manually movable between clamp engaged and disengaged positions. The clamp may also comprise a manual release for moving the retainer between the clamp engaged and disengaged positions. The release is preferably U-shaped with a pair of legs which are pivotally connected to the clamp body and receive opposed tips of the retainer.

According to a second aspect of the present invention, a reciprocating saw comprises a housing, a motor in the housing, a gear train driven by the motor and an output shaft driven by the gear train. A blade clamp, in accordance with the first aspect of the invention described above, is connected to and driven by the output shaft.

Other aspects of the invention will be apparent from reviewing the appended claims.

BRIEF DESCRIPTION OF THE DRAWINGS

The accompanying drawings which are incorporated in, and constitute a part of, this specification illustrate one embodiment of the invention and together with the description serve to explain the principles of the invention.

DESCRIPTION OF THE PREFERRED EMBODIMENT

Figure 1:
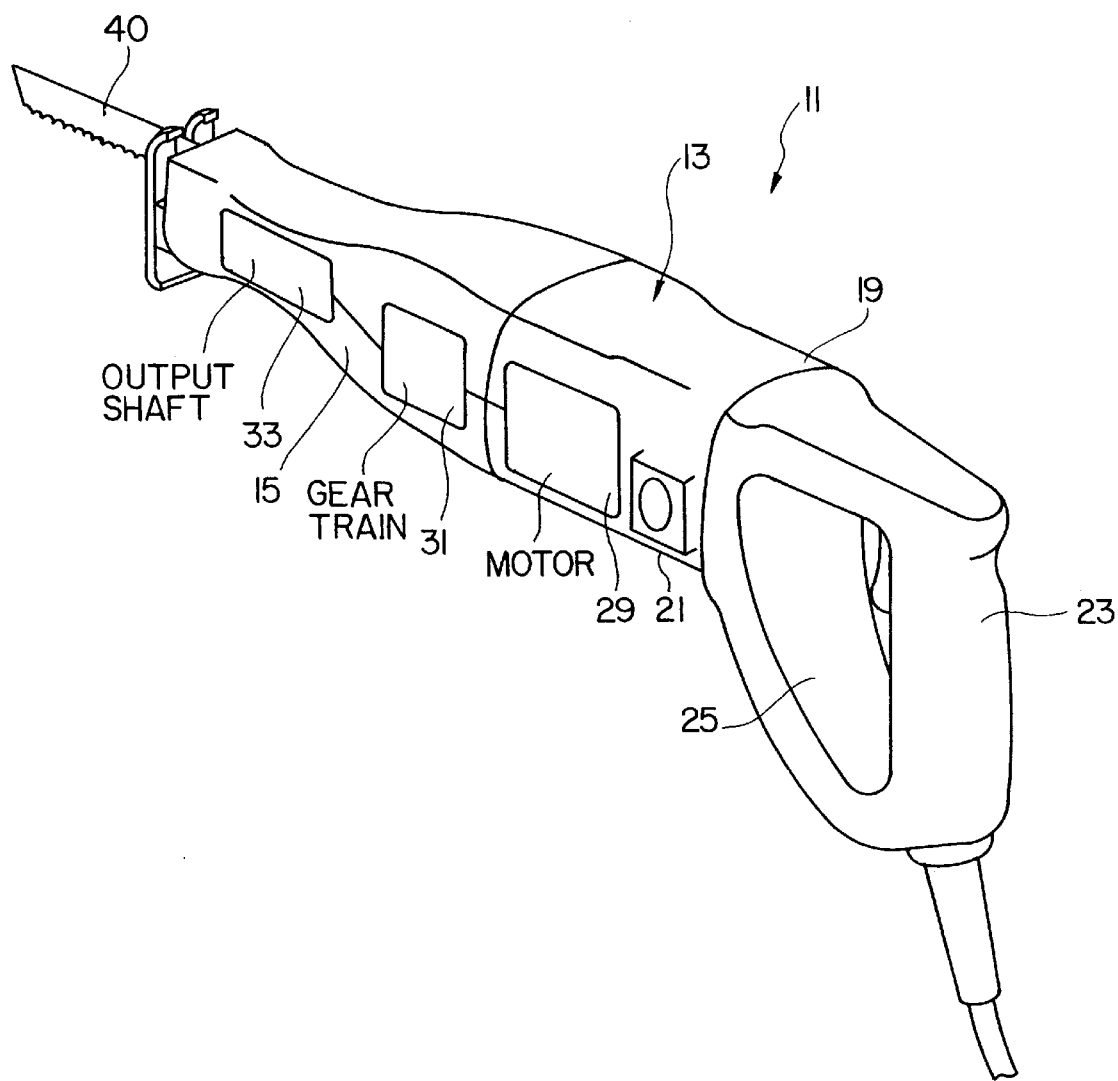
FIG. 1 is a perspective view of a reciprocating saw in accordance with a preferred embodiment of the present invention.
Figure 2:
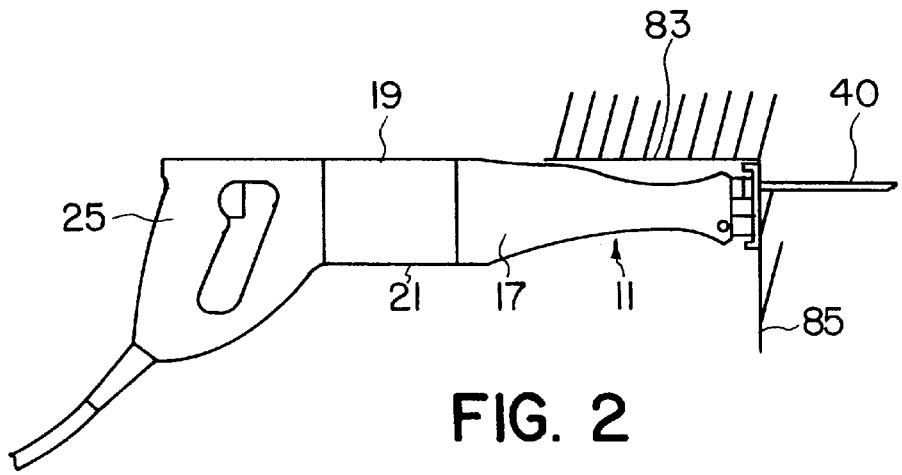
FIG. 2 shows a side elevational view of the saw of FIG. 1 and illustrates an application for the saw when the blade is oriented to reciprocate in a cutting plane perpendicular to the sidewalls of the saw.
Figure 3:
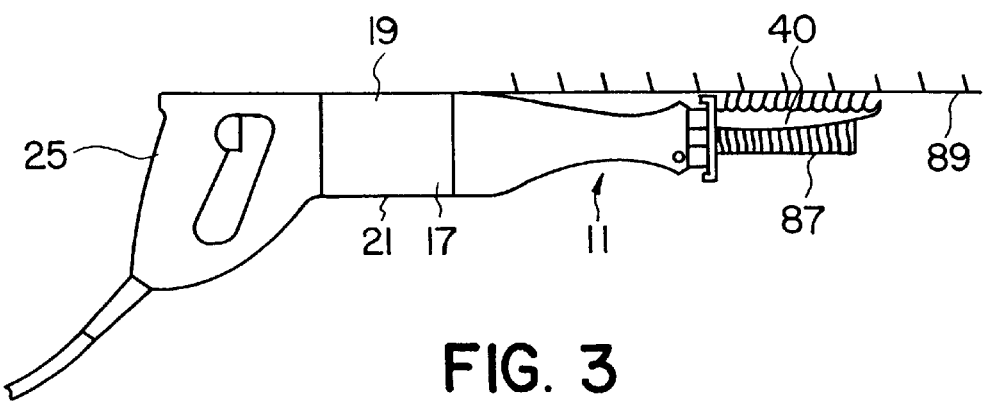
FIG. 3 shows a side elevational view of the saw of FIG. 1 and illustrates an application for the saw when the blade is oriented in a cutting plane parallel to the sidewalls of the saw with the saw teeth projecting upwardly.
Figure 4:
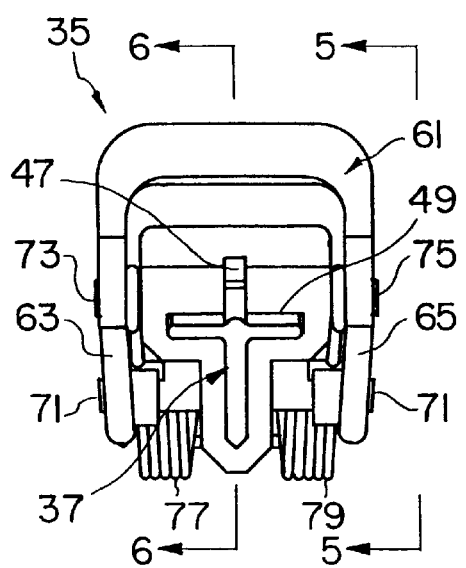
FIG. 4 is a front elevational view of a blade clamp for the saw of FIG. 1 in accordance with a preferred embodiment of the present invention.
Figure 5:
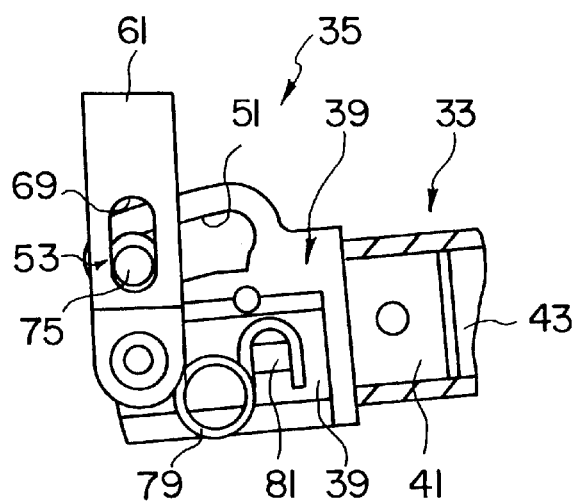
FIG. 5 is a side elevational view, taken along line 5—5 of FIG. 4, of the clamp without a blade mounted in the blade receiving channel.
Figure 6:
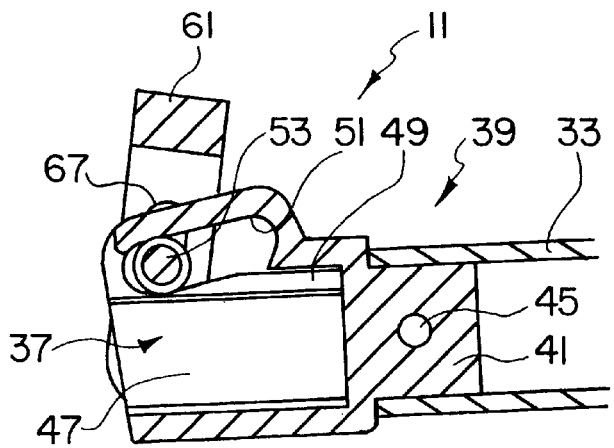
FIG. 6 is a cross sectional view, taken along line 6—6 of FIG. 4, of the clamp without a blade mounted in the blade receiving channel.

The present invention is directed to reciprocating saws preferably of the type shown in FIGS. 1–3 and used for rough cutting applications such as plumbing, heating, ventilating, and air conditioning and to blade clamps for such saws. The clamp of the present invention is preferably used on such reciprocating saws but may be used also on other reciprocating saws commonly known as jigsaws. In addition the clamp could be adaptable to any saw with a thin elongated blade.

According to the present invention, a reciprocating saw 11 comprises a housing 13 which preferably is elongated and includes a pair of opposed sidewalls 15, 17, a top wall 19, a bottom wall 21, a front end, a rear end 23 and a handle 25 adjacent the rear end 23. The top wall 19 and bottom wall 21 extend between the sidewall 15, 17. Such a housing configuration is conventional but the invention is clearly adaptable to other housings such as, for example, disclosed and claimed U.S. patent application Ser. No. 08/720,926, filed on Oct. 4, 1996, assigned to the assignee of the present invention.

According to the present invention (FIG. 1), the saw 11 further comprises a motor 29 disposed in the housing 13. The motor 29 is preferably a conventional motor such as a universal or permanent magnet dc motor commonly used for power tool applications.

According to the present invention (FIG. 1), the saw 11 further comprises a gear train 31 and output shaft 33 and driven by the gear train 31. The gear train 31 is disposed in the housing 13 and connected to and driven by the motor 29. The gear train 31 may be a conventional type such as a bevel gear drive train or a wobble plate drive train which are commonly used for reciprocation saw applications. The output shaft 33 is preferably tubular but may be of any conventional construction such as for example depicted in U.S. Pat. No. 4,976,164.

According to the present invention (FIGS. 4–8), the saw 11 further comprises a keyless clamp 35 attached to and driven by the output shaft 33. The clamp 35 has a channel 37 formed in a clamp body 39 for receiving a blade 40 oriented relative to the channel 37 alternatively in a first cutting plane and in a second plane intersecting the first cutting plane.

Preferably, the body 39 has a cylindrical projection 41 inserted in and rigidly attached to a tubular end 43 of the output shaft 33 of the saw 11 with a pin 45. The channel 37 preferably has a pair of intersecting slots 47, 49 for receiving the blade 40 in the first and second cutting planes, respectively. The slots 47, 49 are sized to be approximately the same size as the blade shank 50. The channel 37 alternatively receives the blade 40 in the first cutting plane in first and second orientations: the first with the teeth facing in same direction as the top wall 19 of the saw housing 13 and the second with the teeth facing in the same direction as the bottom wall 21 of the saw housing 13. The channel 37 alternatively receives the blade 40 in the second cutting plane in third and fourth orientations: the third with the teeth facing in the same direction as the left sidewall 15 and the fourth with the teeth facing in the same direction as the right sidewall 17. The first cutting plane orientations are in 180° offset from each other and the second cutting plane orientations are 180° offset from each other. The first cutting plane orientations are offset from the second cutting plane orientations by 90°.

Figure 7:
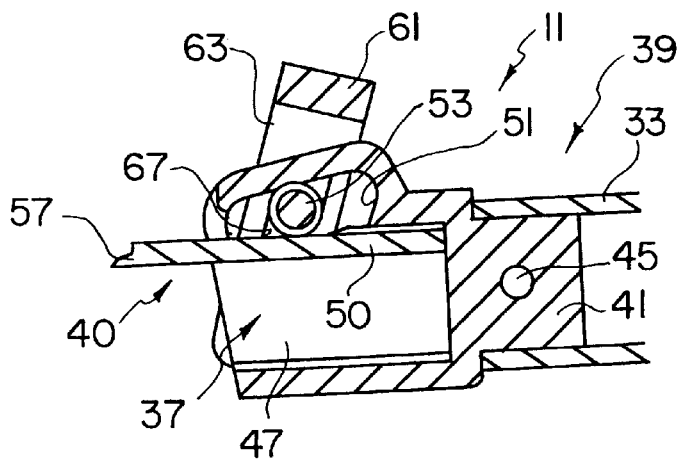
FIG. 7 is a cross sectional view, taken along line 6—6 of FIG. 4, of the clamp with a blade clamped in the blade receiving channel in a cutting plane transverse the sidewalls of the saw.
Figure 8:
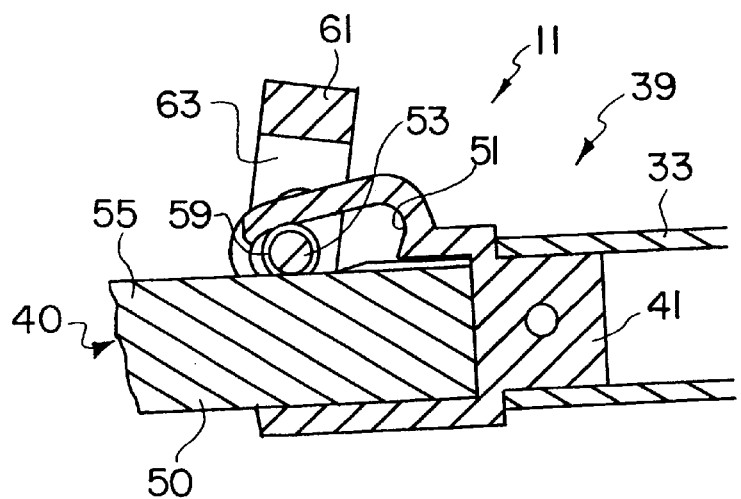
FIG. 8 is a cross sectional view, taken along line 6—6 of FIG. 4, of the clamp with a blade clamped in the blade receiving channel in a cutting plane parallel to the sidewalls of the saw.

Preferably, the clamp 35 further a track 51 formed in the body 39 and a retainer 53 located in the track 51. The retainer 53 is manually movable between clamp engaged and clamp disengaged positions with a blade 40 located in the channel 37 in the first and second cutting planes. The track 51 extends toward and away from the intersection of the slots 47, 49 whereby in the clamp engaged position the retainer 53 can engage, as shown in FIG. 8, the edge 55 of a blade 40 located in the first slot 47 and, as shown in FIG. 7, the sidewall 57 of the blade 40 located in the second slot 49. The retainer 53 is preferably a pin with a centrally disposed, inwardly tapered, annular recess 59 for engaging edge 55 of the blade 40 in the clamp engaged position.

The clamp retainer 53 is preferably manually operable through the use of a manually operable release 61 discussed below so that the clamp 35 is "keyless." Keyless clamps provide the advantage that no tools are required to open and close the clamp. However those skilled in the art will recognize that a retainer such as a set screw requiring a tool to operate may be used according to the principles of the invention.

The clamp 35 preferably further comprises a manual release 61 pivotally connected to the body 39 and engaged with the retainer 53 for moving the retainer 53 between the clamp engaged position and the clamp disengaged position. The release 61 is U-shaped and has a pair of legs 63, 65 pivoted to opposed sides of the body 39 and has an elongated opening 67, 69 in each leg 63, 65 inwardly of the pivotal connection 71 to the body 39 for receiving, respectively, one of the opposed tips 73, 75 of the retainer 53. The release 61 is spring biased counterclockwise (FIG. 5) about pivot 71 into the clamp engaged position by a pair of torsion springs 77, 79. Each torsion springs 77, 79 is connected between one of the opposed retainer pin tips 73, 75 and a nib 81 (only one shown) projecting from each sidewall of the clamp body 39.

In operation, a blade 40 can be alternatively located in the clamp 35 with the teeth facing in the same direction as the top wall 19, bottom wall 21, left sidewall 15 and right sidewall 17 of the saw 11. To insert a blade 40 into the clamp 35, the release 61 in manually pivoted about pivot 71 clockwise in FIG. 5 to move the retainer 53 from the front end of the track 51 to the rear end 23 of the track 51 as the retainer 53 is moved from the bottom to the top of the elongated opening 67, 69 in each leg 63, 65 of the release 61. With the retainer 53 in the rearward portion of the track 51, a blade 40 may be slidably inserted into any of four orientations 90° offset from each other. For example as shown in FIG. 8, the shank 50 of the blade 40 can be inserted into the vertical slot 47 in FIG. 4 with the teeth facing downward or facing in the same direction as the bottom wall 21 of the saw 11. When the shank 50 is fully inserted into the slot 47, the release 61 is released and the retainer 53 is engaged with the upper edge 55 of the blade. Alternatively, the blade 40 can be inserted into the horizontal slot 49 in FIG. 4 with the teeth facing in the same direction as the left sidewall 15 of the saw 11. When the blade 40 is in the horizontal slot 49 the retainer 53 is engaged with the sidewall 57 of the blade shank 50 as shown in FIG. 7.

The versatility of the saw 11 with a blade 40 that can be oriented in 90 degree offset locations is illustrated in FIGS. 2 and 3. As shown in FIG. 2, a cut can be made close to the intersection of two walls 83, 85 joining at a 90 degree angle. When making such a cut, the saw 11 can be held in the normal orientation with the sidewall 15, 17 of the saw 11 vertically aligned. As shown in FIG. 3, a cut can be made in a board 87 attached to a flat surface 89. Again when making such a cut, the saw 11 can be held in the conventional orientation with the sidewalls 15, 17 vertically aligned. Other applications will be apparent to those skilled in the art. As will be recognized the versatility and maneuverability of the saw 11 is markedly enhanced when equipped with a clamp 35 in accordance with the present invention. Also the clamp 35 can be used with other saws such as jigsaw but the greatest advantage is recognized with a reciprocating saw of the type depicted in FIG. 1.

Various modifications and variations can be made in a saw according to the present invention without departing from the scope or spirit of the invention. Thus, the present invention is intended to cover these modifications and variations provided they come within the scope of the appending claims and their equivalents.

What is claimed is:

1. A reciprocating saw comprising:
   a housing;
   a motor in the housing;
   a gear train located in the housing and connected to and driven by the motor;
   an output shaft driven by the gear train;
   a blade clamp attached to and driven by the output shaft;
   the blade clamp including:
      a body having opposed front and rear ends, the rear end fixed to the output shaft;
      a channel having an opening in the front end of the body adapted to receive a shank of a blade alternatively in a first orientation defining a first plane parallel to the axis of reciprocation of the output shaft and in a second orientation defining a second plane intersecting the first plane and parallel to the axis;
      a single U-shaped lever pivotally attached to the front end of the body, the single U-shaped lever having a first and a second generally parallel leg, the single U-shaped lever being movable between a first clamp engaged position, a second clamp engaged position and a clamp disengaged position; and
      a retainer slidably engaging both the first and second legs of the U-shaped lever, the retainer adapted for engagement with the shank of the blade in its first orientation when the single U-shaped lever is in its first clamp engaged position, the retainer adapted for engagement with the shank of the blade in its second orientation when the single U-shaped lever is in its second clamp engaged position.

2. The saw of claim 1 wherein the first and second planes are perpendicular.

3. The saw of claim 1 wherein the channel opening has a first slot extending parallel to the first plane and a second slot extending parallel to the second plane.

4. The saw of claim 3 wherein the first and second slots are each approximately equal to the thickness of the blade shank and are each for slidably receiving the blade shank.

5. The saw of claim 3 wherein the first and second slots are perpendicular.

6. The saw of claim 1 wherein the retainer is engageable with an edge of the blade shank in the first orientation and engageable with a sidewall of the shank in the second orientation.

7. The saw of claim 6 wherein the retainer is a pin with a cylindrical outer surface engageable with the sidewall of the blade shank in the second orientation.

8. The saw of claim 6 wherein the retainer has an inwardly tapered recess for engaging the edge of the blade shank in the first orientation.

9. The saw of claim 1 wherein:
   the body has a track adjacent to the channel and receiving the retainer; and
   the track guides movement of the retainer toward and away from the channel.

10. The saw of claim 1 wherein:
    the housing is elongated in a direction generally parallel to the output shaft, has a pair of opposed sidewalls, a top wall and a bottom wall, the top and bottom walls extending between the sidewalls, a front end, rear end and handle adjacent to the rear end; and
    the first plane intersects the top and bottom wall and the second plane intersects the sidewalls.

11. A reciprocating saw comprising:
    a housing;
    a motor in the housing;
    a gear train located in the housing and connected to and driven by the motor;
    an output shaft driven by the gear train;
    a keyless blade clamp attached to and driven by the output shaft, the clamp having a channel adapted for receiving a blade oriented relative to the channel alternatively in a first cutting plane and in a second cutting plane intersecting the first cutting plane, the clamp including a U-shaped lever having a first and a second generally parallel leg, the U-shaped lever being movable between a first clamp engaged position, a second clamp engaged position and a clamp disengaged position, the clamp further including a retainer slidably engaging both the first and second legs of the U-shaped lever, the retainer adapted for engagement with the shank of the blade in its first orientation when the U-shaped lever is in its first clamp engaged position, the retainer adapted for engagement with the shank of the blade in its second orientation when the U-shaped lever is in its second clamp-engaged position.

12. The clamp of claim 11 wherein the channel has a pair intersecting slots for receiving the blade in the first and second cutting planes, respectively.

13. The clamp of claim 11 wherein:
    the housing is elongated in a direction generally parallel to the output shaft, has left and right opposed sidewalls, a top wall and a bottom wall, the top and bottom walls extending between the sidewalls, a front end, rear end and handle adjacent to the rear end; and
    the channel alternatively receives the blade in the first cutting planes with the teeth facing in same direction as the top wall and with the teeth facing in the same direction as the bottom wall and
    the channel alternatively receives the blade in the second cutting plane with the teeth facing in the same direction as the left sidewall and with the teeth facing in the same direction as the right sidewall.

14. The saw of claim 13 wherein the clamp comprises a body having a track formed in the body; and the retainer located in the track and manually movable between the clamp engaged and clamp disengaged positions.

15. The saw of claim 14 wherein:
    the channel comprises intersecting first and second slots; and
    the track extends toward and away from the intersection of the slots whereby the retainer can engage the edge of a blade located in the first slot and the sidewall of the blade located in the second slot.

16. The saw of claim 15 wherein:
    the track has opposed open ends; and
    the retainer is a pin with a tip extending into each of the of the lever.

17. The saw of claim 11 wherein the clamp comprises:
    a body having opposed front and rear ends, the rear end fixed to the shaft; wherein the channel has an opening in the front end adapted for slidably receiving a blade shank in the first and second cutting planes.

18. A reciprocating saw comprising:
    a housing;
    a motor in the housing;
    a gear train located in the housing and connected to and driven by the motor;

an output shaft driven by the gear train;

a keyless blade clamp attached to and driven by the output shaft; and the clamp having a pair of intersecting slots adapted for receiving a blade in first and second cutting planes, the clamp including a U-shaped lever having a first and a second generally parallel leg, the U-shaped lever being movable between a first clamp engaged position, a second clamp engaged position and a clamp disengaged position, the clamp further including a retainer slidably engaging both the first and second legs of the U-shaped lever, the retainer adapted for engagement with the shank of the blade in its first orientation when the U-shaped lever is in its first clamp engaged position, the retainer adapted for engagement with the shank of the blade in its second orientation when the U-shaped lever is in its second clamp-engaged position.

19. A keyless blade clamp for a reciprocating saw comprising:

a body;

a channel in the body and having intersecting slots adapted for receiving a blade in first and second cutting planes; and a single U-shaped lever pivotally attached to the body, the single U-shaped lever having a first and a second generally parallel leg, the U-shaped lever being manually movable between a first clamp engaged position, a second clamp position and a clamp disengaged position; and a retainer slidably engaging both the first and second legs of the U-shaped lever, the retainer adapted for engagement with the shank of the blade in its first orientation when the U-shaped lever is in its first clamp engaged position, the retainer adapted for engagement with the shank of the blade in its second orientation when the U-shaped lever is in its second clamp-engaged position.

20. A keyless blade clamp for a reciprocating saw comprising:

a body;

a track formed in the body;

a channel in the body adapted for receiving a blade oriented relative to the channel in first and second cutting planes;

a U-shaped lever pivotally attached to the body; and a retainer located in the track and slidingly engaging the lever, the lever being manually movable between a first clamp engaged position, a second clamp engaged position and a clamp disengaged position, the first clamp engaged position adapted for engagement between the retainer and the blade in the first cutting plane, the second clamp engaged position adapted for engagement between the retainer and the blade in the second cutting plane.

21. The clamp of claim 20 wherein:

the channel is adapted to alternatively receive the blade in the first cutting plane in first and second 180° offset orientations and alternatively is adapted to receive the blade in the second cutting plane in third and fourth 180° offset orientations; and the first, second, third and fourth orientations are each 90° offset from each other.

22. The clamp of claim 21 wherein the channel has intersecting first and second elongated slots.

23. The clamp of claim 22 wherein:

the track extends toward and away from the intersection of the slots whereby the release can engage the edge of a blade located in the first slot and the sidewall of the blade located in the second of the second slots.

24. The clamp of claim 23 wherein:

the track has opposed open sides;

the U-shaped lever has a pair of legs pivotally connected to opposite sides of the body and has an elongated opening in each leg inwardly of the pivotal connection to the body; and the retainer is a pin with a tip extending into each of the opposed open sides of the track.

25. A clamp for a reciprocating saw comprising:

a body for attachment to an output shaft of the saw;

a U-shaped lever pivotally attached to the body;

a single retainer slidingly engaging the lever and movable between a first clamp engaged position, a second clamp engaged position and a clamp disengaged position; and a channel formed in the body adapted for receiving a blade oriented relative to the channel alternatively in a first cutting plane and in a second cutting plane intersecting the first cutting plane, the first clamp engaged position adapted for engagement with the blade in the first cutting plane, the second clamp engaged position adapted for engagement with the blade in the second cutting plane.

26. A reciprocating saw comprising:

a housing;

a motor in the housing;

a gear train located in the housing and connected to and driven by the motor;

an output shaft driven by the gear train;

a blade clamp attached to and driven by the output shaft;

the clamp comprising:
 a body having opposed front and rear ends, the rear end fixed to the output shaft; and
 a channel having an opening in the front end of the body for receiving a shank of a blade alternatively in a first orientation defining a first plane parallel to the axis of reciprocation of the output shaft and in a second orientation defining a second plane intersecting the first plane and parallel to the axis;

a U-shaped lever pivotally attached to the body; and a single retainer slidingly engaging the lever, the lever being movable between a first clamp engaged position, a second clamp engaged position and a clamp disengaged position, the first clamp engaged position adapted for engagement between the retainer and the blade in the first cutting plane, the second clamp engaged position adapted for engagement between the retainer and the blade in the second cutting plane.

* * * * *